(12) United States Patent
Edwards et al.

(10) Patent No.: US 6,931,540 B1
(45) Date of Patent: Aug. 16, 2005

(54) SYSTEM, METHOD AND COMPUTER PROGRAM PRODUCT FOR SELECTING VIRUS DETECTION ACTIONS BASED ON A PROCESS BY WHICH FILES ARE BEING ACCESSED

(75) Inventors: Jonathan L. Edwards, Hillsboro, OR (US); Edmund H. White, Beaverton, OR (US)

(73) Assignee: Networks Associates Technology, Inc., Santa Clara, CA (US)

( * ) Notice: Subject to any disclaimer, the term of this patent is extended or adjusted under 35 U.S.C. 154(b) by 598 days.

(21) Appl. No.: 09/586,265

(22) Filed: May 31, 2000

(51) Int. Cl.[7] .................................................. G06F 1/24
(52) U.S. Cl. ..................... 713/188; 713/165; 713/187; 713/200; 713/201
(58) Field of Search .......................... 713/187–188, 713/200–201, 165; 714/38

(56) References Cited

U.S. PATENT DOCUMENTS

| | | | |
|---|---|---|---|
| 5,623,600 A | * | 4/1997 | Ji et al. ........................ 713/201 |
| 5,960,170 A | * | 9/1999 | Chen et al. .................... 714/38 |
| 6,393,568 B1 | * | 5/2002 | Ranger et al. ............... 713/188 |
| 6,735,700 B1 | * | 5/2004 | Flint et al. ................... 713/200 |

OTHER PUBLICATIONS

Office Action dated Jun. 17, 2004, which was filed in U.S. Appl. No. 09/585,811 filed May 31, 2000.

* cited by examiner

*Primary Examiner*—Gregory Morse
*Assistant Examiner*—Tongoc Tran
(74) *Attorney, Agent, or Firm*—Zilka-Kotab, PC; Christopher J. Hamaty

(57) ABSTRACT

A system, method and computer program product are provided for on-access computer virus scanning of files in an efficient manner. If no identifier is assigned to a process for accessing files, virus detection actions are selected based at least in part on the identification of the process. Further, an identifier is assigned to the process. Thereafter, virus detection actions may be selected based at least in part on the identifier for accelerating the selection process. In operation, the selected virus detection actions are performed on the files.

20 Claims, 4 Drawing Sheets

SYSTEM, METHOD AND COMPUTER PROGRAM PRODUCT FOR SELECTING VIRUS DETECTION ACTIONS BASED ON A PROCESS BY WHICH FILES ARE BEING ACCESSED

RELATED APPLICATION

The present application is related to an application filed concurrently herewith under the title "System, Method and Computer Program Product for Process-Based Selection of Virus Detection Actions" and which is incorporated herein by reference in its entirety.

FIELD OF THE INVENTION

The present invention relates to virus detection methods, and more particularly to executing virus detection methods in a manner that ensures the efficient utilization of system resources.

BACKGROUND OF THE INVENTION

Virus scanners traditionally provide off-access virus scanning, e.g., a file is scanned when it is not in use. Typically scanning is performed at an off-peak time, such as during the night, when it is most likely that all files will be available for review by the scanning software. Unfortunately, the advent of fast Internet connection, and the proliferation of computers in the workplace and home, allows the users to obtain and share files much faster than the traditional virus scanners can scan and correct viruses. Consequently, off-peak scanning services are no longer sufficient.

To compensate, on-access scanning has been developed. In on-access scanning, as the name suggests, a file is scanned when access is attempted to the file. This scanning may be performed along with traditional scanning services. On-access scanning operates by configuring an operating system (or equivalent control program) to notify the on-access software when a file access attempt is made. For example, file access subroutines of the operating system may be replaced with specialized versions tailored to interact with on-access scanning software. Or, in an event driven environment, the operating system (or equivalent event-control structure) can be instructed to route file access events to the scanning software. In either configuration (or equivalents), file access attempts are effectively intercepted by the scanning software to provide an opportunity to scan the file for viruses before a file requestor obtains access to the file.

Unfortunately, there are several problems with on-access scanning. One such problem is the balancing of security needs against causing file-access errors or otherwise overly-delaying access to a file. For security, a file should be scanned before being released to a requestor. Since file access attempts are intercepted, a user requesting the file must therefore wait for scanning to complete before access is granted. If the wait is too long, the user may believe that there has been a software and/or hardware malfunction. Similarly, if the requester is another program, the program may believe there has been some sort of input/output (I/O) or other error.

To provide an appropriate balance to the foregoing problem, on-access virus scanning techniques have been developed to afford a maximum amount of security while minimizing the amount of system resources used to provide such security. One example of such techniques is to conditionally scan files based on a type of file that is being released to a requester. It is known that executable files and macro files are more susceptible to virus propagation with respect to data files, e.g. image files, text files, etc. As such, scanners have been configured to allow certain files such as data files to be released with less security measures than executable and macro files.

This exemplary prior art technique, however, fails to take into account other factors that may be useful in determining whether more or less security measures are required. For instance, present techniques fail to take into account the manner in which various program-implemented processes access files. While some of such processes commonly open files that are requested, some merely provide rudimentary forms of access such as indexing or the like. As such, different levels of security may be necessary for opening files under different processes. There is therefore a need for a system that uses resources more efficiently during virus scanning by taking more into account than just the types of files being accessed, etc.

Such a technique of analyzing processes would, however, require additional resources in and of itself. As mentioned earlier, such resources must be conserved, especially during on-access scanning. There is thus a further need for a system that takes more into account than just the types of files being accessed, wherein such system does so without excessive use of resources.

DISCLOSURE OF THE INVENTION

A system, method and computer program product are provided for on-access computer virus scanning of files in an efficient manner. If no identifier is assigned to a process for accessing files, virus detection actions are selected based at least in part on the identification of the process. Further, an identifier is assigned to the process. Thereafter, virus detection actions may be selected based at least in part on the identifier for accelerating the selection process. In operation, the selected virus detection actions are performed on the files. By employing the identifier, the technique of selecting the virus detection actions based on the identification and analysis of the process may be avoided.

In one preferred embodiment, the identifier may be cleared upon the occurrence of a predetermined event. Such event may take the form of the termination of an application. Further, the identifier may be reused after being cleared.

In another preferred embodiment, the identifier may be assigned by the application. Further, such application may be adapted for executing the process.

DESCRIPTION OF THE PREFERRED EMBODIMENTS

Computer systems include hardware and software for storing files and executing processes that interact with the files during use. Such processes often interact with the files in different ways depending on the ultimate goal at hand. For example, the files may be merely organized by a first process, and actually opened by another. Further, certain processes may be dedicated to accessing files from certain sources, such as the Internet. Since virus propagation is often dependent on the extent to which the file is accessed, the source of the file, and other factors and aspects associated with accessing the file, it is apparent that different levels of security are necessary.

Figure 1:
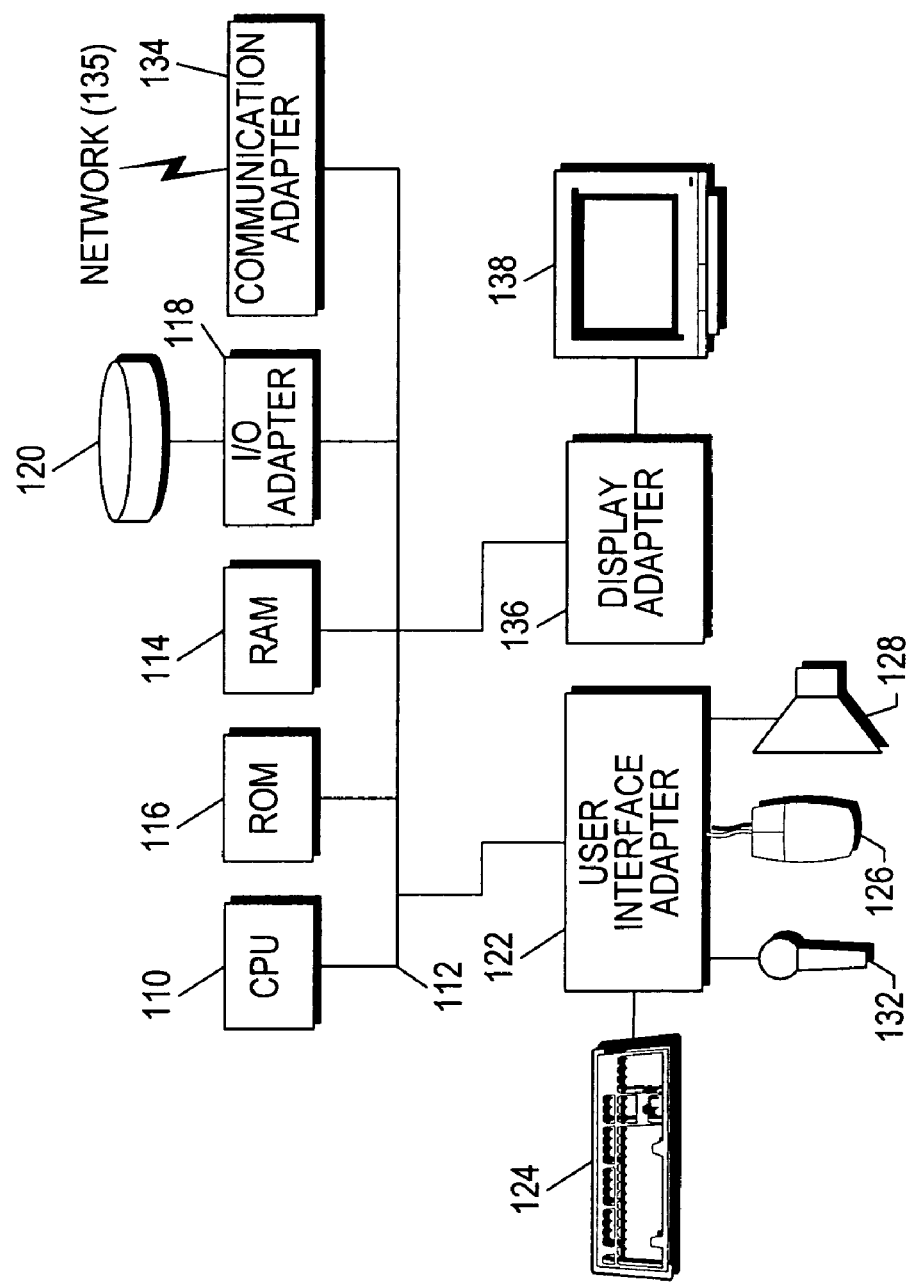
FIG. 1 shows a representative hardware environment on which processes may be executed to interact with files.

FIG. 1 shows a representative hardware environment on which processes may be executed to interact with files. Such figure illustrates a typical hardware configuration of a workstation in accordance with a preferred embodiment having a central processing unit 110, such as a microprocessor, and a number of other units interconnected via a system bus 112. The workstation shown in FIG. 1 includes a Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface devices such as a touch screen (not shown) to the bus 112, communication adapter 134 for connecting the workstation to a communication network 135 (e.g., a data processing network) and a display adapter 136 for connecting the bus 112 to a display device 138.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 2:
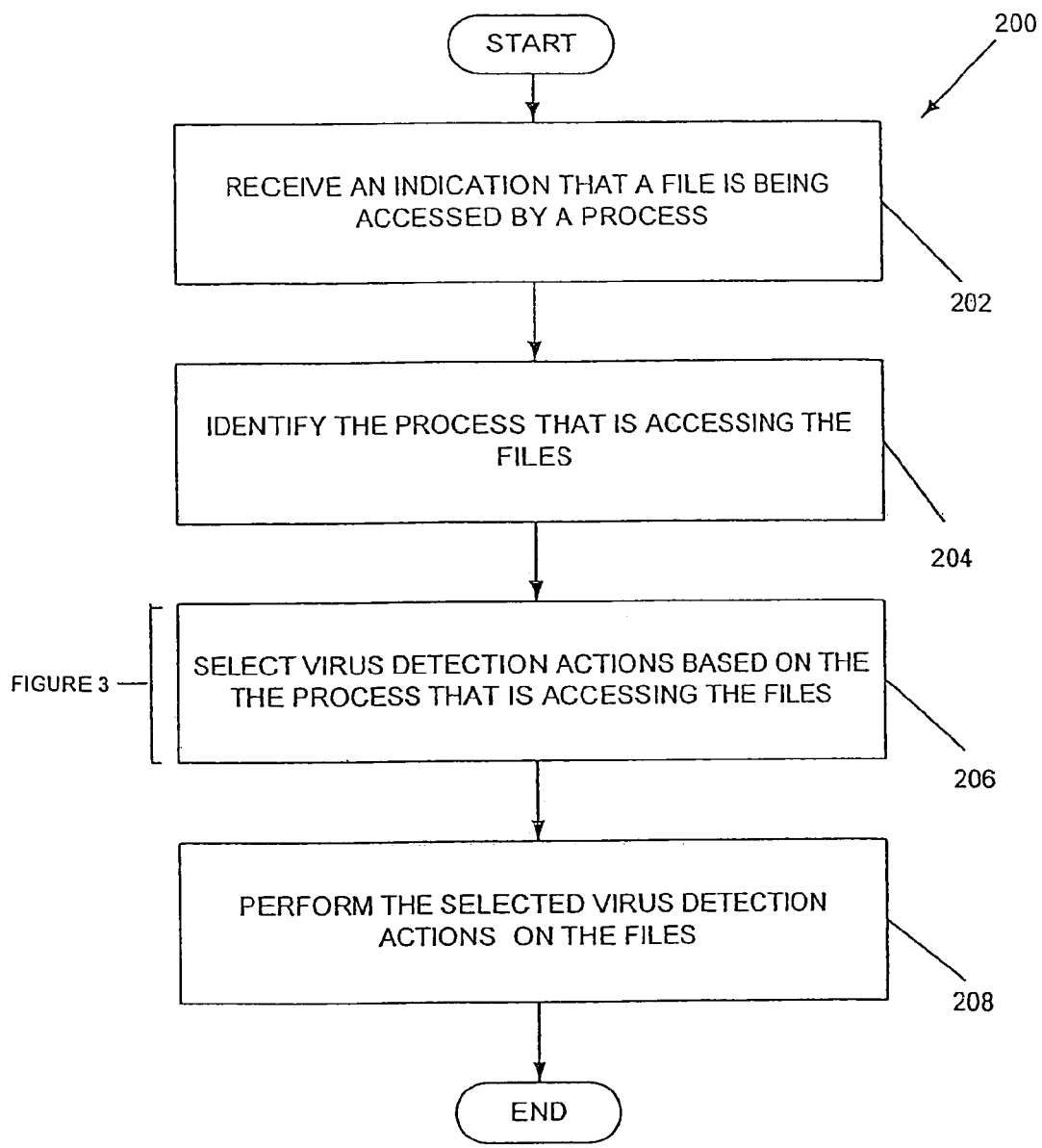
FIG. 2 shows steps taken in providing on-access computer virus scanning in an efficient manner in accordance with a preferred embodiment.

FIG. 2 illustrates a method 200 of providing on-access computer virus scanning in an efficient manner in accordance with a preferred embodiment. In operation 202, an indication is first received that a file is being accessed by a process. This may be accomplished by intercepting a file call command, or by any other technique known in the art.

Next, in operation 204, a process that is being used for accessing files is identified. It should be noted that the process may be associated with an executable file or application. The identity of such process is thus readily ascertainable by an operating system of the hardware environment by inspecting a name or extension of the associated executed file, or by any other known technique. In the present description, it should be understood that the phrase accessing files may refer to various functions each subjecting the operating system to varying degrees of vulnerability to virus, attacks, etc. Just by way of example, such accessing may include opening the files, reading the files, executing the files, indexing the files, organizing the files, editing the files, moving the files, or any other function that involves the files.

Thereafter, in operation 206, virus detection actions are selected based at least in part on the process. More information will be set forth regarding operation 206 of FIG. 2 during reference to FIG. 3. The virus detection actions are then performed on the files being accessed. Note operation 208. To this end, varying levels of security may be employed based on the process that is accessing the files. This allows for more efficient use of system resources while maintaining an appropriate level of security that suits the functions being carried out by the processes currently being executed by the system.

Figure 3:
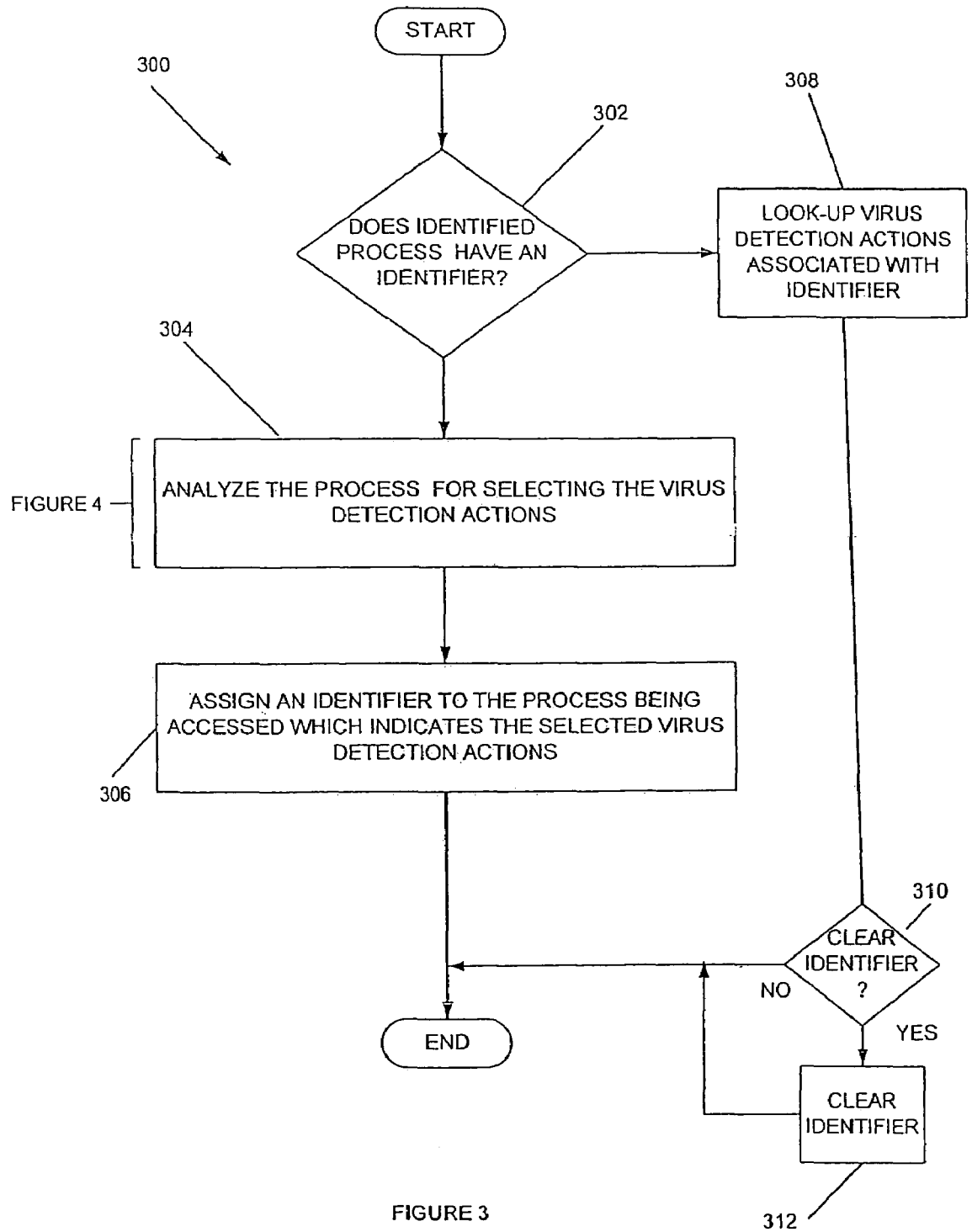
FIG. 3 shows steps taken in selecting virus detections actions based on a process that is accessing the files.

FIG. 3 is a flowchart illustrating a method 300 for selecting virus detections actions based on the process that is accessing the files in accordance with operation 206 of FIG. 2. It is first determined in operation 302 whether the process identified in operation 204 of FIG. 2 has an identifier associated with it. It should be noted that when a process is first encountered, an identifier may not yet be assigned.

If this is the case, the process is analyzed for selecting the virus detection actions, as indicated in operation 304. More information will be set forth regarding operation 304 of FIG. 3 during reference to FIG. 4. Thereafter, an identifier is assigned to the process in operation 306. Such identifier may be used to indicate the selected virus detection actions. In a preferred embodiment, the identifier may be generated when the process is first executed by an application running the process.

The assignment of the identifier allows the accelerated selection of the virus detection actions when files are repeatedly accessed by the process. This is apparent after decision 302 when it is determined that the process does indeed have an identifier. As shown in FIG. 3, the virus detection actions are simply looked up based on the identifier. Note operation 308.

In decision 310, it is decided whether the identifier should be cleared. This decision may be conditioned upon the occurrence of a predetermined event, such as the termination of an application. If, in the present example, a currently run application is terminated, the identifier associated with a process of the application may be cleared in operation 312. Accordingly, the identifier may be reused for different processes.

Figure 4:
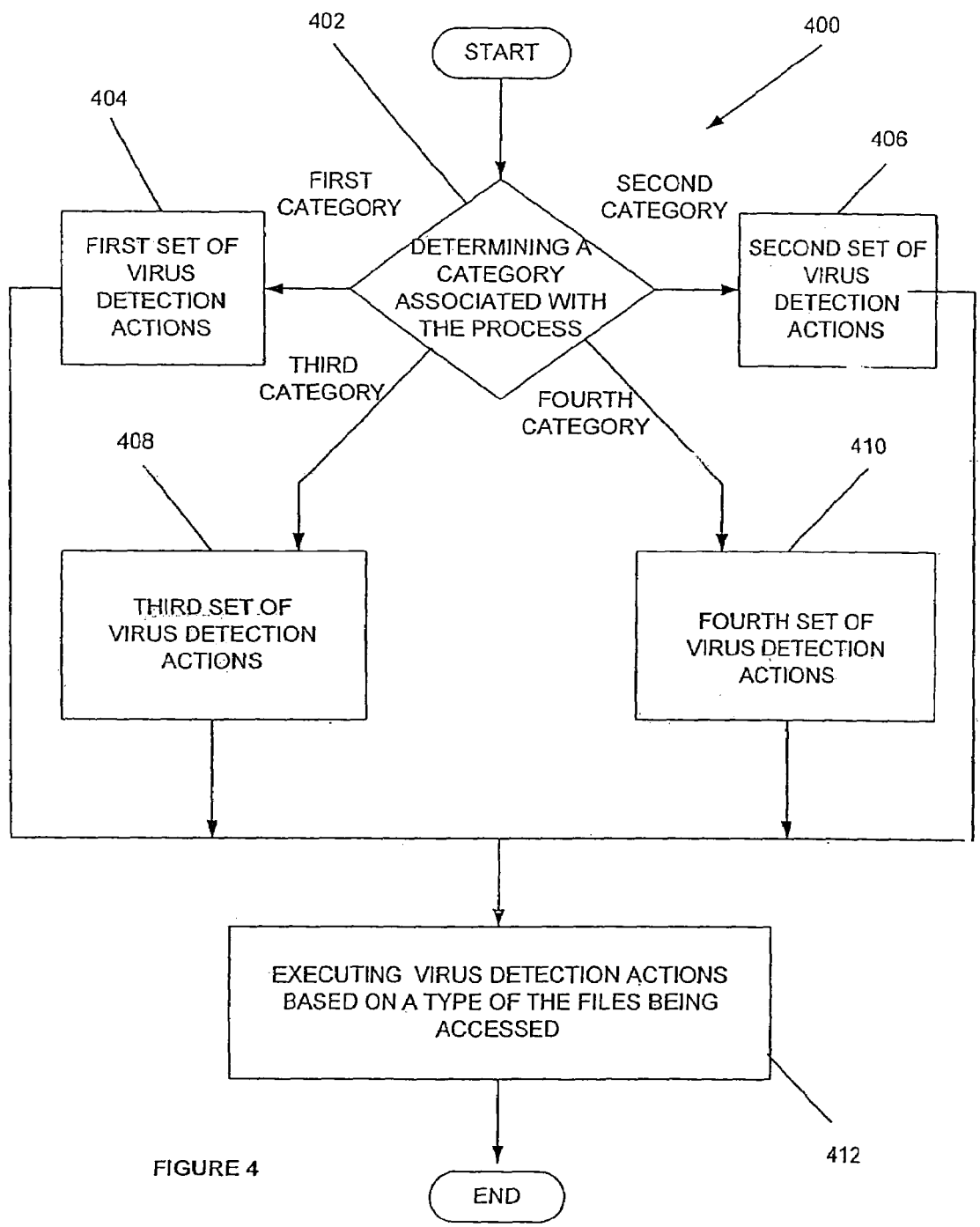
FIG. 4 shows steps taken in analyzing a process for accessing files to select appropriate virus detection actions.

FIG. 4 is a flowchart illustrating a method 400 in which the processes are analyzed for selecting the virus detection actions in accordance with operation 304 of FIG. 3. As shown, the virus detection actions may be selected by determining a category associated with the process in decision 402. In the present description, virus detection actions may refer to the utilization of digital signature comparisons, heuristic algorithms, or any other action capable of detecting viruses.

In order to facilitate the selection of the appropriate virus detection actions, each process may have an associated access risk level identifier associated therewith. In such preferred embodiment, a set of virus detection actions may then be selected based on the category to which the risk level identifier corresponds. In particular, a first, second, third, and fourth set of virus detection actions may be selected in operations 404, 406, 408, and 410, respectively.

It should be noted that processes may be identified and categorized in any desired manner. For example, the processes may be identified by inspecting a name of the process, a path of the process, a file signature associated with the process(CRC or other), a version of the process, a manufacturer of the process, a function being called during the process, an owner of the process, a name of an executable file associated with the process, a method in which files are being accessed by the process (opened for read, opened for write, execution, etc.), a user of the process, type(s) of shared libraries used by the identified process, and/or any other type of security details of a current thread of execution. With respect to inspecting the user of the process, a group in which the user resides or a location of the user may be ascertained, e.g. at a local console, at a remote console, etc.

In addition to selecting the virus detection actions based on the identified process, the files being accessed may be identified themselves. The virus detection actions may thus be selected based at least in part on the identity of the files. See operation 412. The identity of the files may be determined based on various factors such as the name, path, extension, and/or type of the file. In operation, more security measures may be executed for certain types of files which are more likely to propagate virus, e.g. executable files, macro files, etc., and less security measures may be executed for types of files which are less likely to propagate virus, e.g. data files, image files, etc.

A specific example will now be set forth for illustrating one possible implementation of a preferred embodiment. As set forth earlier, some processes open a large amount of files which may not need to be scanned securely because there is no risk of a virus propagating. An example of such a scenario on a Windows® platform would be the known executable file FindFast.exe. FindFast.exe is a component of Microsoft® Office® that often runs in the background, and opens all the files on a disk in order to construct an index. Because FindFast.exe is continuously opening files which are instantly scanned by an on-access scanner program, it can use significant system resources. This is often done in vain since FindFast.exe is not accessing the files, or the macros therein, in such a way that they are a risk from a virus propagation point of view.

A converse situation involves processes that open a small amount files which need to be scanned very well because they are being opened in such a way that viruses could propagate. For instance, on the Windows® platform, WinWord.exe from Microsoft® Office® accesses Word® documents such that they are opened, and associated macros are executed. Further, Explorer.exe and IExplore.exe are used to download files from the Internet, a known source of viruses.

In accordance with a preferred embodiment, the common global or default configuration for the on-access scanner may be supplemented by a separate defined set of categories that apply to certain processes. Upon the appropriate category being found for a process, specifically tailored virus detection actions may be executed. Table 1 illustrates the predetermined categories, the exemplary processes that may fall within the categories, the virus detection actions associated with each of the categories, and the file types along with the associated subset of refined virus detection actions in accordance with the present example.

In accordance with the principles of FIG. 4, Table 1 illustrates that the processes associated with Explorer.exe and Iexplore.exe may be put in a first category. Further, the first set of virus detection actions may be defined as including the steps of scanning all files, and using macro and program heuristics. Further, the processes associated with WinWord.exe may be placed in a second category. The second set of virus detection actions may then be defined as including the steps of scanning only files with a recognized extension, checking all files for macros, and using macro heuristics.

Still yet, the processes associated with FindFast.exe may be placed in a third category, and the third set of virus detection actions may be defined as including the step of not scanning any file. A fourth default category may also be defined for encompassing all processes not already accounted for. In such case, the fourth set of virus detection actions may be defined as including the step of scanning only files with a recognized filename extension.

The first and second categories thus ensure that security is heightened in those cases where it is needed. Further, the third and fourth categories prevent on-access scanning of too many files and interfering with the users of the system. The present example of categories is thus particularly useful when utilized in conjunction with a Microsoft® Terminal Server that supports many users who are running processes on the local system.

It should be noted that the number of categories need not be set at four, and may include more or less based on the desires of the user. For example, yet another category may be defined for processes that load Wsock32.dll. Such category may have a set of virus detection actions including the steps of scanning all files, and using macro and program heuristics. Monitoring a particular library such as Wsock32.dll may be beneficial in identifying a process that requires a higher level of security with regard to scanning its file accesses.

Specifically, many applications that can download files from the Internet use the "winsock" library (implemented in WSock32.dll on Windows® NT). Accordingly, a process that loads this library is a potential source of infected files. Thus, the foregoing technique is particularly beneficial since it allows the system administrator to ensure that users are prevented from downloading infected files from the Internet whether they are using Internet Explorer®, Netscape® or some other application that is not commonly known.

TABLE 1

| Category | Exemplary Processes | Process-based Virus Detection Actions | File Types | File type-based Virus Detection Actions |
|---|---|---|---|---|
| First | Explorer.exe, Iexplore.exe | 1) Scan all files<br>2) Use macro and program heuristics | .jpg | predetermined virus detection action (VDA) |
| | | | .exe | predetermined VDA |
| | | | .dll | predetermined VDA |
| Second | WinWord.exe | 1) Scan only files with a recognized extension<br>2) Check all files for macros<br>3) Use Macro heuristics | .jpg | predetermined VDA |
| | | | .exe | predetermined VDA |
| | | | .dll | predetermined VDA |
| Third | FindFast.exe | Do not scan any file | .jpg | predetermined VDA |
| | | | .exe | predetermined VDA |
| | | | .dll | predetermined VDA |
| Fourth | Default | Scan only files with a recognized filename extension | .jpg | predetermined VDA |
| | | | .exe | predetermined VDA |
| | | | .dll | predetermined VDA |

As shown in Table 1, the virus detection actions may also be refined based on the type of files being accessed. In particular, additional or specifically tailored virus detection actions may be executed which are consistent and in compliance with the virus detection actions selected based on the process. For example, if the process dictates that no virus detection actions are permitted, no virus detection actions may be executed based on the file type.

While only .jpg, .exe, and .dll file types are shown in Table 1, it should be understood that any number of files of any type may be included per the desires of the user. For each of the categories, the different types of files may warrant different predetermined virus detection actions. For example, scanning of .exe file types may include a comprehensive set of actions including heuristic algorithms, signature scanning, etc., and a jpg file type may include a simple set of actions including just signature scanning, if any actions at all. These actions may vary from category to category.

A two-tier indexing system is thus afforded for providing an optimal balance between security and efficient use of system resources. In one aspect of the preferred embodiments, a first aspect of a system is initially identified. Next, a second aspect of the system is identified. Virus detection actions are then selected based at least in part on the first aspect of the system and at least in part on the second aspect of the system. Thereafter, the virus detection actions are performed on the files.

In the context of the preferred embodiment set forth hereinabove, the first aspect of the system may include a process adapted for accessing the files, and the second aspect of the system may include a type of the files. It should be understood, however, that the various aspects of the system may relate to any feature or parameter of the system that, when changed, may effect a change in the likelihood of virus propagation.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for on-access computer virus scanning of files in an efficient manner, comprising the steps of:
   (a) identifying a process for accessing files and selecting virus detection actions based at least in part on the identified process if no identifier is assigned thereto;
   (b) assigning an identifier to the process if no identifier is assigned thereto;
   (c) selecting virus detection actions based at least in part on the identifier if existent; and
   (d) performing the virus detection actions on the files;
   (e) wherein the process is associated with an application program, and different identifiers are assigned to different application programs so that the virus detection actions are tailored for the processes associated with the application programs.

2. The method as recited in claim 1, wherein the identifier is cleared upon the occurrence of a predetermined event.

3. The method as recited in claim 2, wherein the identifier is reused after being cleared.

4. The method as recited in claim 2, wherein the event is the termination of an application.

5. The method as recited in claim 4, wherein the identifier is assigned by the application.

6. The method as recited in claim 4, wherein the application is adapted for executing the process.

7. A computer program product for on-access computer virus scanning of files in an efficient manner, comprising:
   (a) computer code for identifying a process for accessing files and selecting virus detection actions based at least in part on the identified process if no identifier is assigned thereto;
   (b) computer code for assigning an identifier to the process if no identifier is assigned thereto;
   (c) computer code for selecting virus detection actions based at least in part on the identifier if existent; and
   (d) computer code for performing the virus detection actions on the files;
   (e) wherein the process is associated with an application program, and different identifiers are assigned to different application programs so that the virus detection actions are tailored for the processes associated with the application programs.

8. The computer program product as recited in claim 7, wherein the identifier is cleared upon the occurrence of a predetermined event.

9. The computer program product as recited in claim 8, wherein the identifier is reused after being cleared.

10. The computer program product as recited in claim 8, wherein the event is the termination of an application.

11. The computer program product as recited in claim 10, wherein the identifier is assigned by the application.

12. The computer program product as recited in claim 10, wherein the application is adapted for executing the process.

13. A system for on-access computer virus scanning of files in an efficient manner, comprising:
   (a) logic for identifying a process for accessing files and selecting virus detection actions based at least in part on the identified process if no identifier is assigned thereto;
   (b) logic for assigning an identifier to the process if no identifier is assigned thereto;
   (c) logic for selecting virus detection actions based at least in part on the identifier if existent; and
   (d) logic for performing the virus detection actions on the files;
   (e) wherein the process is associated with an application program, and different identifiers are assigned to different application programs so that the virus detection actions are tailored for the processes associated with the application programs.

14. The system as recited in claim 13, wherein the identifier is cleared upon the occurrence of a predetermined event.

15. The system as recited in claim 14, wherein the identifier is reused after being cleared.

16. The system as recited in claim 14, wherein the event is the termination of an application.

17. The system as recited in claim 16, wherein the identifier is assigned by the application.

18. The system as recited in claim 16, wherein the application is adapted for executing the process.

19. The method as recited in claim 1, wherein the virus detection actions are selected by determining a category associated with the process based on the identifier, and selecting a set of virus detection actions based on the determined category.

20. The method as recited in claim 19, wherein the identifier reflects a risk level associated with the application program, and a plurality of categories each have virus detection actions tailored for an associated risk level.

* * * * *